Nov. 14, 1939.  C. H. RIPPL  2,180,171
TIMING CONTROL FOR PNEUMATICALLY OPERATED SWITCHES
Filed Feb. 1, 1937  3 Sheets-Sheet 1

Inventor
CHARLES H. RIPPL.
By Stough and Canfield
His Attorneys

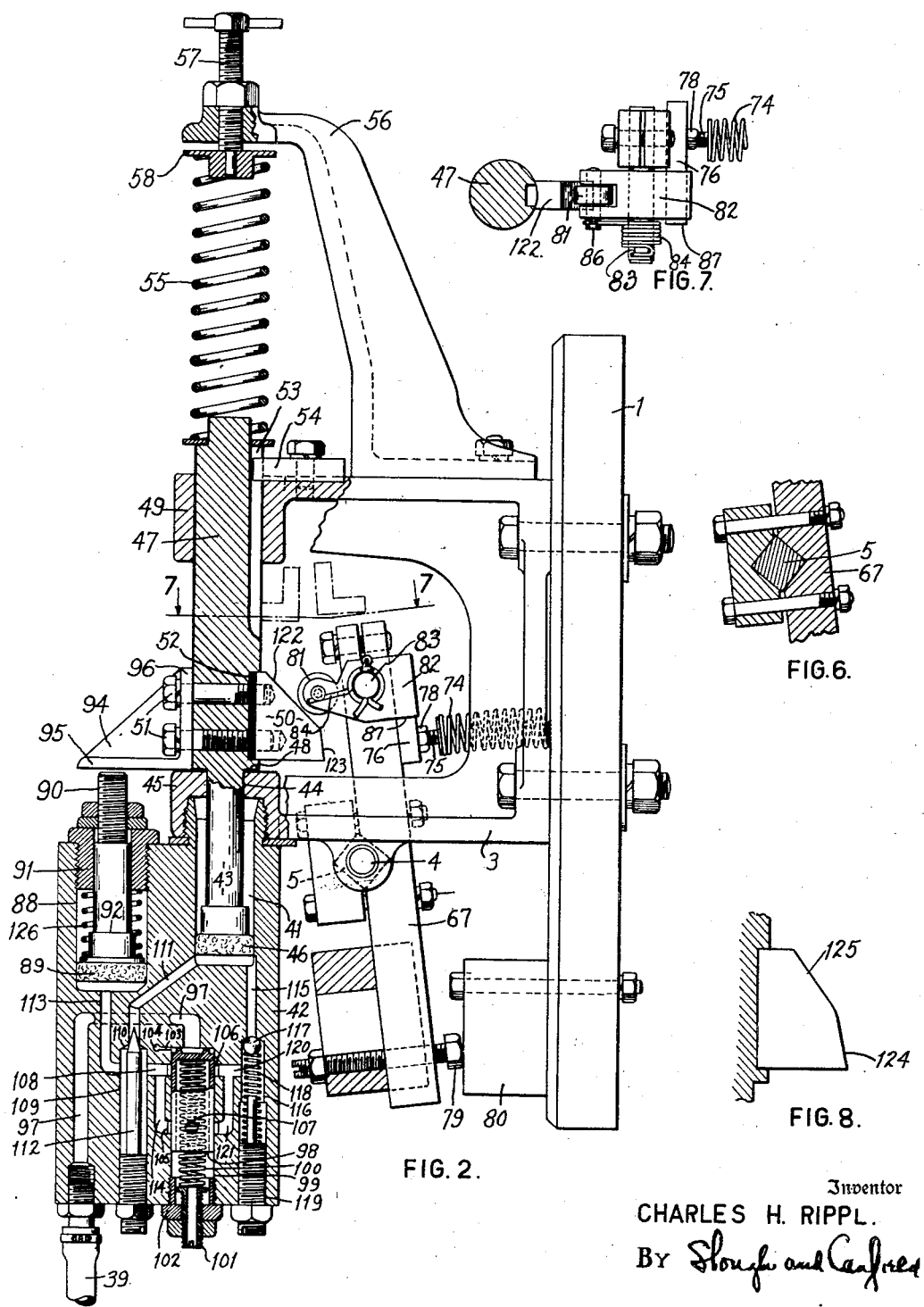

Nov. 14, 1939.  C. H. RIPPL  2,180,171
TIMING CONTROL FOR PNEUMATICALLY OPERATED SWITCHES
Filed Feb. 1, 1937  3 Sheets-Sheet 3

Inventor
CHARLES H. RIPPL.
By Slough and Canfield
His Attorneys

Patented Nov. 14, 1939

2,180,171

UNITED STATES PATENT OFFICE 2,180,171

TIMING CONTROL FOR PNEUMATICALLY OPERATED SWITCHES

Charles H. Rippl, Cleveland, Ohio, assignor to The Clark Controller Company, Cleveland, Ohio, a corporation of Ohio Application February 1, 1937, Serial No. 123,357

14 Claims. (Cl. 200—97)

This invention relates to electric switches of the class for controlling the duration of an electric current and particularly the duration of the electric curent at the welding electrodes of a welding gun or other welding machine or device.

The invention relates more particularly to current timing switches which are operated pneumatically although, as will appear hereinafter, it relates to switches operated by other means as well.

It is among the objects of the invention:

To provide an improved current timing electric switch;

To provide a pneumatically operated switch having improved means for timing the duration of the current controlled thereby;

To provide an improved welding current control switch adapted in an improved manner to be operated by fluid pressure under the control of a welding device using the current such for example, as a welding gun.

To provide improved means for controlling the operation of a current timing electric switch.

Other objects will be apparent to those skilled in the art to which my invention appertains.

My invention is fully disclosed in the following description taken in connection with the accompanying drawings in which:

Fig. 2 is a longitudinal sectional view to an enlarged scale taken from the plane 2—2 of Fig. 1 with some of the parts in side elevation;

Fig. 6 is a fragmentary sectional view taken from the plane 6—6 of Fig. 1;

Fig. 7 is a part plan, part sectional view taken from the plane 7—7 of Fig. 2;

Fig. 8 is a view illustrating one of the elements shown in the other figures but in modified form.

Figure 1:
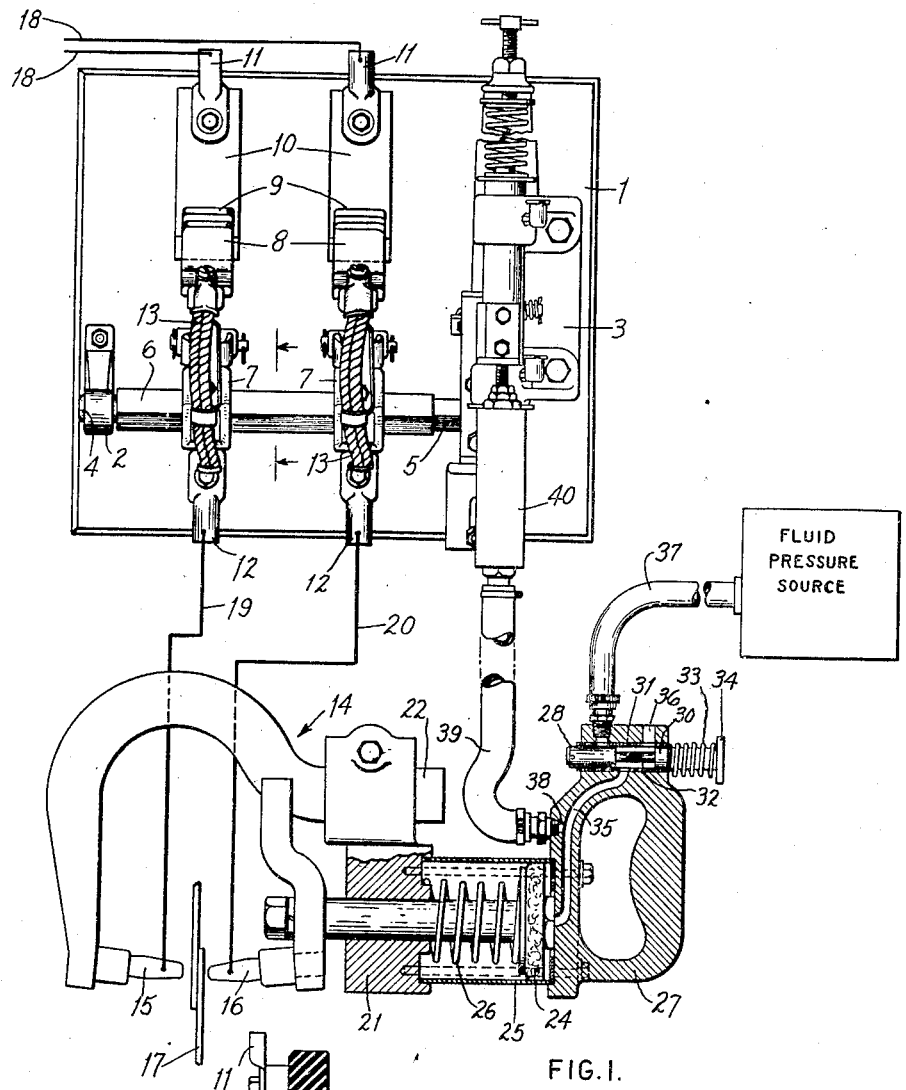
Fig. 1 is a front elevational view of a switch embodying my invention associated with a welding gun, the gun being illustrated at a different scale from that of the switch.

Referring to the drawings, Fig. 1, I have shown at 1 a supporting panel preferably of insulating material, having spaced bearing brackets 2 and 3 on which is oscillatably supported the rounded end portions 4—4 of a shaft 5, a part of the length of which has telescoped thereon an insulating tube 6. Switch arms 7—7 are clamped on the shaft 5 and carry contacts 8—8 engageable with stationary contacts 9—9 mounted upon terminal blocks 10—10 on the panel 1 to which are connected terminals 11—11. Terminals 12—12 secured to the panel are connected by flexible leads 13—13 to the contacts 8—8.

The parts just described constitute an electric switch or contactor of well known form whereby upon rotation of the shaft 5 clockwise as viewed in Fig. 6, contacts 8 and 9 will be engaged and vice versa will be disengaged to control current in conductors connected to the terminals 11 and 12. The details of construction of the contactor constitute no essential part of my invention. Any suitable construction may be employed, the preferred construction having the elements thus far described.

At 14 is illustrated generally a welding gun having stationary and movable electrodes 15 and 16, the movable electrodes 16 being adapted to be moved, in a manner to be described, to compress, between the electrodes, work illustrated at 17 to be welded. The electrodes 15 and 16 are supplied with welding current supplied by the diagrammatically illustrated circuit including supply mains 18—18 connected to the switch terminals 11—11 and wires 19 and 20 connected respectively to the electrodes 15 and 16 and to the terminal 12. As will be understood, when the switch shaft 5 is oscillated to engage contacts 8 and 9, current will flow from the supply mains 18 to one electrode, through the work 17 and by way of the other electrode back to the other side of the line, to effect a weld at the work 17, and this current may be supplied from any suitable source such as the low voltage secondary of an alternating current transformer.

If preferred, the wires 19 and 20 may energize the primary of a transformer and the electrodes 15 and 16 may be connected to the transformer secondary, as is well known in practice.

The construction of the gun 14 by which the electrode 16 may be pressure-moved, is not essential to the instant invention. Any of the well known pneumatically operated welding guns or machines may be utilized. In the form illustrated, the gun comprises a body 21 in which is clamped a shank 22 supporting the electrode 15 and in which is reciprocable a piston rod 23 carrying at its outer end the electrode 16 and at its inner end connected to a piston 24 reciprocable in a cylinder 25. A spring 26 normally holds the piston 24 toward the right or electrode-disengaged position; and compressed air may be admitted to the other side of the piston 24 to propel it in the cylinder to engage the electrodes against tension of the spring 26.

A handle 27 for the gun operator has reciprocable in a bore therein, a valve 28 of the piston valve type having piston portions 29 and 30, substantially sealing the bore 31, and an interconnecting neck 32. The valve 28 is normally disposed in an off position by a spring 33 abutting upon the handle at one end and upon an operator's valve button 34 at the other end; and in this position effects communication, by way of a duct 35 in the handle, from the cylinder 25 through the bore 31 around the neck 32 to atmosphere by way of an outlet duct 36.

When the operator presses the button 34, the valve 28 is moved over toward the left as viewed in the drawings, and first closes off the outlet 36 and then effects communication of the duct 35 with a conduit 37 connected to a source of fluid, such for example as air, under pressure; thereupon, the compressed air flows by way of the duct 35 to the cylinder 25 and operates the piston for the purpose described.

Any suitable means may be provided as the source of fluid pressure referred to, and the conduit 37 is preferably a flexible hose and may be of well known construction.

A branch duct 38 communicates with the duct 35 and with another preferably flexible hose type conduit 39. The conduits 39 and 37 may be connected to the handle 27 by suitable threaded nipples thereon screwed into threaded bores in the handle as illustrated. The conduit 39 communicates with a cylinder and piston type pneumatic device 40 to be described mounted on the panel 1, and the conduit 39 as well as the conduit 37 is of suitable length so that the panel 1 may be stationarily mounted on a wall, column or the like, and the gun freely movable by the operator from point to point along his work.

Referring now to the pneumatic device 40, at 41 is a pneumatic cylinder in a valve housing 42, communicating at its lower end with the conduit 39 under valve control in a manner to be described.

A piston rod 43 is reciprocable in a bore 44 in a boss 45 on the bearing bracket 3, above referred to, which is secured to the panel 1 and the piston rod carries on its lower end a piston 46 fitted in the bore 41 of the cylinder.

The upper end of the piston rod 43 is enlarged into a plunger 47 above the boss 45, providing a shoulder 48 resting upon the upper side of the boss 45 and supporting the piston rod and piston and the plunger 47. The bracket 3 has also an upper boss 49 in a bore of which the upper end of the plunger 47 is reciprocably supported.

The plunger 47 has secured thereto a cam 50 of the inclined plane type seated in a recess in the plunger and secured in the recess by bolts 51—51 projected through the plunger and threaded into the cam, and a plurality of shims 52—52 may be provided at the bottom of the recess to adjustably position the cam laterally of the plunger.

The plunger 47 is provided with a longitudinal slot 53, and a finger 54 secured to the upper side of the bracket 3 projects into the slot to prevent rotation of the plunger and lateral displacement of the cam 50, and with this provision, the plunger 47 may for convenience be made cylindrical.

The plunger 47 projects above the boss 49 and telescoped over the upper end thereof is a spring 55. A bracket 56 is mounted on the bracket 3 and at its upper end has an adjusting screw 57 therein carrying a rotatable head 58 upon which the upper end of the spring 55 abuts. By turning the screw 57, the compression force of the spring may be adjusted.

Within the valve housing 42 is a valve arrangement to be more fully described to control the air supplied to the cylinder 41, by the conduit 39. Upon admission of air pressure to the cylinder, the piston 46 is moved upwardly and upon releasing the pressure it moves downwardly.

Figure 5:
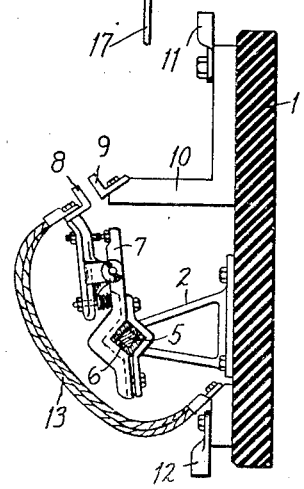
Fig. 5 is a fragmentary sectional view to an enlarged scale taken from the plane 5—5 of Fig. 1.

An arm 67 is rigidly secured to the shaft 5 in any suitable manner, for example by a clamp element 68 and bolts 69—69 as shown in Fig. 5. By this means, the shaft 5 is caused to oscillate in unison with the arm 67.

A spring 74 abuts at one end upon the panel 1 and at its other end upon the head of a stud 75 threaded into a lug 76 on the arm 67, which lug is preferably a separate piece secured to the arm 67. The spring 74 thus constrains the arm 67 and therefore the shaft 5 and its switch arms 7—7 to a counter-clockwise position, as viewed in Fig. 2. The tension of the spring 74 may be adjusted by turning the stud 75 and locking it by nuts 78—78. The position of the arm 67 is determined by an adjustable stop comprising a stud 79 adjustably threaded in the arm 67 and engaging a block 80 secured to the panel 1.

Above the shaft 5, the arm 67 has mounted thereon a cam follower in the form of a roller 81 disposed adjacent to the cam 50, and rotatably supported on a pin 86 in a forked pawl 82 which, in turn, is pivoted on a pin 83 mounted on the arm 67. A coil spring 84 wound around the pin 83 and secured at one end thereto as at 85 has the other end engaging the under side of the pin 86 constraining the pawl to rotate clockwise, as viewed in Fig. 2; and the pawl is stopped against clockwise rotation by engaging a portion 87 thereof with the lug 76 but is free to rotate counter-clockwise.

Besides the cylinder 41 in the valve housing 42, the housing is provided with a cylinder 88 in which is reciprocable a piston 89 having a piston rod 90 guided in a plug 91, screwed into the upper end of the cylinder 88, and the lower end of the plug 91 is engageable by the upper end portion 92 of the piston 89 to predetermine and stop the upward movement of the piston 89 after it has made a stroke of predetermined length.

Above the plug 91, the piston rod 90 has thereon a lock nut 93 which adjustably stops the downward position of the piston 92. A spring 126 abutting upon the plug 91 and upon the piston normally holds the piston down, and after an upward movement thereof quickly returns it.

A bracket 94 having a flange 95 directly above the upper end of the piston rod 90 is secured to the plunger 47 by the bolts 51—51, the bracket preferably having a flange 96 lying against the plunger 47 and through which the bolts 51—51 are projected.

By means of the valve arrangement in the housing 42 which will now be described, air from the conduit 39 is admitted to the cylinder 41 and the cylinder 88; and is preferably admitted directly to the cylinder 88 to instantly move the piston 89 through its stroke above described; and is admitted adjustably to the cylinder 41 to adjustably determine the velocity of movement of the piston 46.

The valve arrangement in the valve housing 42 may be, as stated above, of any suitable construction and arrangement but preferably embodying means by which compressed air conducted by the conduit 39 will be admitted relatively rapidly to the cylinder 88 and relatively slowly to the cylinder 41. The parts within the valve housing 2 are illustrated as disposed in a single longitudinal plane but the arrangement of the parts within the housing may, if preferred, be of the nature of the parts in a generally similar housing which constitutes the subject matter of my Patent No. 2,172,261, September 5, 1939 for improvements in "Pressure control for pneumatically operated switches", to which reference may be had.

When pressure is admitted through the conduit 39, it is communicated by a duct 97 to the upper end of a piston valve 98 reciprocable in a bore 99. The upper end of the valve closes the end of the duct 97 and is held in duct-closing position by a compresion spring 100 reacting at its upper end upon the valve and at its lower end upon a tubular screw 101 threaded into a thimble 102 which, in turn, is threaded into the cylinder 99 and by this means the spring 100 may be adjusted.

When the pressure in the duct 97 rises to a predetermined value, depending upon the adjustment of the spring 100, it forces the valve 98 downwardly. The upper end of the valve is of reduced diameter so that when the valve starts to move, the full area thereof is exposed to the fluid pressure and therefore its movement is complete and immediate. To prevent application of pressure to the full area of the end of the valve, if fluid should leak around the reduced diameter end of the valve, a bleeder duct 103 is provided communicating with the cylinder 99 above the full diameter portion of the valve and exhausting to atmosphere through a duct 104.

A pair of longitudinally spaced annular chambers 105 and 106 are formed in the wall of the cylinder 99 surrounding the valve. The valve has one or more ports 107 through the tubular wall thereof which, when the valve is in its upper position, communicate with the annular chamber 105 but which are closed off by the wall of the cylindrical bore when the valve moves downwardly.

When the pressure in the duct 97 moves the valve downwardly, it establishes communication between the duct 97 and the annular chamber 106 over the top of the valve. This pressure is communicated by a duct 108 to a valve bore 109 having a valve seat 110 at the upper end thereof, the valve being annular and communicating by a duct 111 with the cylinder 41. A needle valve 112 is threaded at its lower end into the bore 109 sealing the same and at its upper end projects into the valve seat 110 to adjustably vary the opening thereof. A duct 113 communicates between the bore 109 and the cylinder 88. An exhaust duct 114 communicates between the duct 108 and the annular chamber 105.

An exhaust duct 115 communicates between the cylinder 41 and an exhaust bore 116 in which is disposed a check valve ball 117 at the mouth of the duct 115 and pressed thereagainst by a spring 118, the tension of which is adjustable by a screw 119 threaded in the housing and having an end projecting upwardly into the bore 116.

The bore 116 communicates by a duct 120 with the annular chamber 106 and the duct 120 communicates by a duct 121 with the annular chamber 105.

The operation of the apparatus as thus far described will now be described. The normal position of the parts is that shown in Figs. 1, 2, 5, 6, and 7.

The operator preparing to make a weld, places the electrodes 15 and 16 relative to the work 17 as shown in Fig. 1 and then presses the valve button 34. Compressed air then flows from the source through the conduit 37, through the duct 35, and operating the piston 24, compresses the work between the electrodes with the desired welding pressure. Compressed air at the same time also flows from the conduit 37 through the ducts 35 and 38 to the conduit 39. While the air is discharging into the cylinder 25 and expanding therein, the pressure in the conduit 39 is low, but when the electrodes have been pressed into engagement with the work, this pressure rises and finally the pressure in the conduit 39 becomes a high pressure.

The pressure in the conduit 39 communicated to the duct 97 and to the upper end of the valve 98, (see Fig. 1) finally reaches the value for which the spring 100 is adjusted, and then moves the valve downwardly, communicating the pressure in the duct 97 to the duct 108 and to the cylinder 88. The piston 89 is thereby immediately moved upwardly substantially without delay and the upper end of the piston rod 90 engages the flange 95 of the bracket 94 and moves the plunger 47 upwardly against the pressure of the spring 55.

Figures 3, 4:
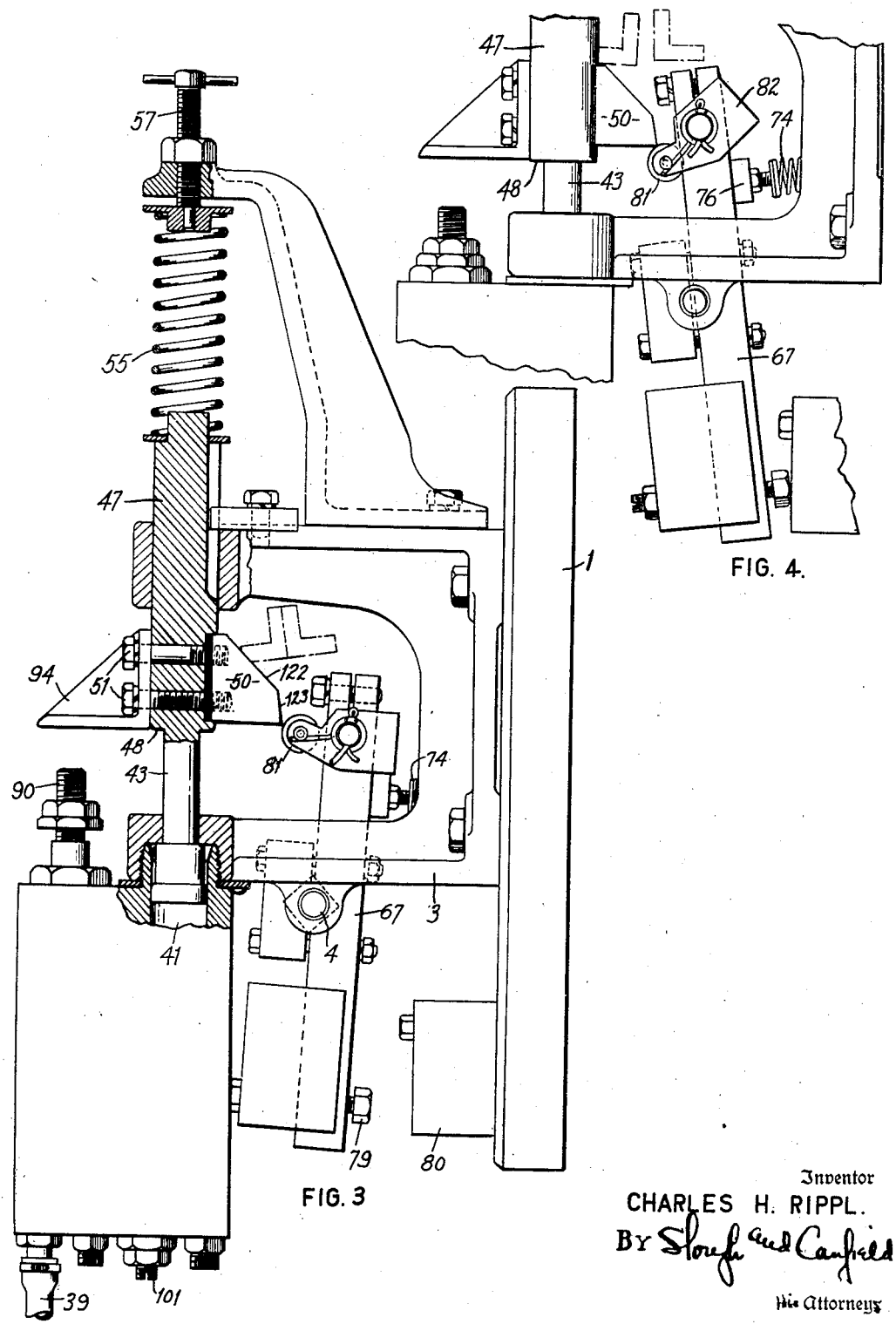
Figs. 3 and 4 are fragmentary views similar to a part of Fig. 2 illustrating operating parts of that figure in different positions.

This movement of the plunger 47 moves the cam 58 into engagement with the cam follower roller 81 and as the cam moves over the roller, the arm 67 is rotated clockwise as viewed in Figs. 2 and 3. The movement of the arm 67 communicated to the shaft 5 rocks the switch arms 7—7 to engage the contacts 8—8 with the contacts 9—9 starting a welding current impulse to the gun electrodes 15 and 16, as described above.

As the cam 58 continues to move upwardly, the roller 81 will roll from the inclined cam face 122 which it initially engages, on to the substantially vertical cam face 123. At this point in the upward movement of the plunger 47, the piston end portion 92 engages the plug 91 and stops thereon. This much of the movement of the plunger 47 and cam 58 takes place with great velocity so that the contacts 8 and 9 are immediately closed.

Referring to Fig. 1 again, when air pressure from the duct 97 was admitted to the duct 108 and thence through the duct 113 to the cylinder 89, air pressure was also admitted to the bore 109 and therefrom through the valve seat 110 under control of the needle valve 112, to the duct 111 and thence to the cylinder 41.

The upward movement of the plunger 47 by the piston 89, above described, moved the piston 46 upwardly therewith. The flow of air under pressure to the cylinder 41, now continues the movement upwardly of the plunger 47 and the cam 58, and the rate of movement thereof is relatively slow being controlled by the needle valve 112. During this slow upward movement, the roller 81 moves over the cam face 123 until it passes over the under side of the cam, the parts at this time being in substantially the position shown in Fig. 3. When the roller rolls under the cam, the spring 74 rocks the arm 67 counterclockwise and opens the switch contacts, as will be understood, ending the current impulse to the welding electrodes. Thus the movement upwardly of the plunger 47, as will now be understood, is at first a quick movement which quickly closes the switch contacts and is subsequently a slow movement timing the duration of the closed condition of the contacts. A welding current impulse of timed duration is thus effected and, particularly when the duration of the impulse is long, no time is lost in moving the contacts into engagement, the slow movement of the plunger 47 not beginning until after the contacts have been engaged or substantially engaged. As will be apparent, the welding circuit is both closed and opened by the upward movement of the plunger 47. A cam operated switch of this general class constitutes the subject matter of the co-pending applications of Charles H. Rippl, Serial No. 62,795 filed February 7, 1936 for "Welding current control apparatus", and Edward G. Beiderman, Serial No. 84,981 filed June 13, 1936 for "Time controlled electric switches", and subject matter relating thereto in this application but not claimed herein is claimed in said applications.

In some cases, the rapid initial upward movement and abrupt stopping of the plunger to engage the contacts and start the time interval may cause the arm 67 to move by inertia beyond its cam-moved position, in other words may cause it to overtravel. When this is not desirable, the cam may be constructed as shown in Fig. 8 having a more steeply inclined face 124 upon which the roller 81 will roll from the initially engaged face 125. Since the face 124 continues to move the arm 67 at a reduced rate until the plunger 89 stops, there will be little or no tendency for the arm to overtravel and cause the roller to leave the cam.

The duration of the current impulse thus produced may be varied by adjustably changing the position of the cam by means of the shims 52 or by any of the several means more fully described in the above mentioned pending applications. Obviously the duration of the current impulse may be changed by varying the adjustment of the needle valve 112 which changes the rate at which the cam moves after the contacts have been engaged.

After the weld has been completed and pressure in the conduit 39 is released by the operator of the gun button 34, the valve 28 will move back to its normal position shutting off pressure from the source and exhausting pressure from the gun and from the conduit 39 through the duct 35 and out by the outlet 36. Thereupon the piston valve 98 will be restored upwardly by the spring 109 and the cylinders 88 and 41 will exhaust to atmosphere. The cylinder 88 exhausts downwardly through the duct 113 and the duct 108 and the duct 114 to the annular chamber 105, thence through the ports 107 and out through the tubular screw 101. The cylinder 41 exhausts downwardly through the duct 115 forcing the ball valve 117 from its seat and thence through the duct 120 and duct 121 to the annular chamber 105, etc., as just stated.

The cylinders being exhausted, the pistons therein fall immediately, being accelerated by the spring 55 above the plunger 47 and the spring 126 above the piston 89. During this movement, the cam 50 will ride over the cam follower 81 causing the pawl 82 to rock on its pin against the tension of the spring 84, the parts then appearing as in Fig. 4 and after the cam has passed beyond the roller, the roller will again snap back into its original position preparatory for another operation.

When very long duration of current impulse is wanted, the air may be admitted through the needle valve seat 110 at such a slow rate that pressure in the cylinder 41 will be released by leakage backwardly through the duct 115 and around the check valve ball 117. To prevent this, the duct 120 establishes main pressure communication to the bore 116 on the under side of the ball 117 holding it firmly on its seat and preventing any such leakage of pressure.

Many of the details of the valve arrangement of Fig. 2 illustrated and described herein are claimed in the above mentioned Patent 2,172,261.

This invention is not limited to the exact construction illustrated and described herein but is inclusive of all modifications and changes and mechanical equivalents thereof by which the invention may be practiced and which come within the scope of the following claims.

I claim:

1. In an electric timing apparatus, a switch having an open and a closed position and biased to one position, an apparatus element arranged to first operate the switch to move it from its biased position, and to hold it in said operated position, and then after a predetermined time interval to release it to allow it to return to its biased position, all during movement of the reciprocatory element in one direction, retarding means effective to retard the movement of the reciprocal element only after an initial substantially unretarded switch closing movement thereof.

2. In an electric current timing apparatus, a switch having an open and a closed position and biased to open position, an apparatus element arranged to close the switch and hold it closed and after predetermined time intervals to release it to allow it to open all during movement of the said element in one direction, the said element being ineffective to operate the switch in the return direction movement, retarding means effective to retard the movement of the said element in the switch operating direction after operation of the switch but ineffective to retard it until after an initial substantially unretarded switch closing movement thereof.

3. In an electric current timing apparatus, an electric switch having an open and a closed position and biased to open position, a reciprocable apparatus element arranged to initially close the switch and then to hold it closed while continuing to move and then after a predetermined time interval allowing the switch to return to its biased position all during one continuous reciprocation of the element in one direction and the reciprocable element being ineffective to operate the switch in the return reciprocatory direction, retarding means effective to retard the movement of the reciprocable element in the switch closing direction after substantially unretarded movement thereof sufficient to initiate closing of the switch.

4. In an electric current timing apparatus, a switch having an open and a closed position and biased to open position, a reciprocable mechanism element, a cam, and a cam follower one supported by the element and the other by the switch, the element arranged to engage the cam and cam follower to close the switch during reciprocatory movement of the element in one direction and to hold it closed during a continuation of said movement and at the end of a predetermined time interval to cause the cam to disengage the follower to allow the switch to return to open position, the reciprocable element being ineffective to operate the switch in the other direction of reciprocation, means to retard movement of the reciprocable element in the switch closing direction after the reciprocable element has substantially unretardedly moved sufficiently to effect closing of the switch.

5. In an electric current timing apparatus, an electric switch, an apparatus element arranged to operate the switch and then restore it by continued movement of the apparatus element in one direction, a source of fluid pressure, a fluid pressure device comprising means arranged to receive fluid pressure substantially unretardedly from the source and adapted to effect an initial substantially unretarded movement of the apparatus element to unretardedly operate the switch and comprising means arranged to receive fluid pressure retardedly from the source and adapted to effect retarded continued movement of the apparatus element to maintain the switch operated and after a time interval to restore it.

6. In an electric current apparatus, an electric switch, an apparatus element arranged to operate the switch and then restore it by continued movement in one direction, a source of fluid pressure, a fluid pressure chamber comprising a movable wall, means to transmit movement of the movable wall to the apparatus element, conduit means to admit fluid pressure from the source to the chamber substantially unretardedly to effect substantially unretarded initial movement of the apparatus element sufficiently to unretardedly operate the switch, a second fluid pressure chamber comprising a movable wall, a second means transmitting movement of the second movable wall to the apparatus element, conduit means to admit fluid pressure from the source to the second chamber at a retarded rate to effect retarded continued movement of the apparatus element to continue maintaining of the switch in operated condition for a time determined by the extent of retardation of fluid admission to the second fluid pressure chamber and then restore it.

7. In an electric current apparatus, an electric switch, an apparatus element arranged to operate the switch and then restore it by continued movement in one direction, a source of fluid pressure, a fluid pressure chamber comprising a movable wall, means to transmit movement of the movable wall to the apparatus element, conduit means to admit fluid pressure from the source to the chamber substantially unretardedly to effect substantially unretarded initial movement of the apparatus element, to substantially unretardedly operate the switch, a second fluid pressure chamber comprising a movable wall, a second means transmitting movement of the second movable wall to the apparatus element, conduit means to admit fluid pressure from the source to the second chamber at a retarded rate to effect retarded continued movement of the apparatus element to maintain the switch operated for a time interval and then to restore it.

8. In an electric current timing apparatus, a switch having an open and a closed position and biased to open position, a reciprocable mechanism element, a cam, a cam follower one supported by the element and the other by the switch, the element arranged to engage the cam and cam follower to close the switch during reciprocatory movement of the element in one direction and to hold it closed during a continuation of said movement and at the end of a predetermined time interval to cause the cam to disengage the follower to allow the switch to return to open position, the reciprocable element being ineffective to operate the switch in the other direction of reciprocation, the cam having a plurality of camming portions at different inclinations to cause the cam follower to move in the switch closing direction at different velocities in different parts of the said reciprocatory movement of the said element.

9. The apparatus described in claim 6 and in which independently operating means are provided to return the first and second movable walls after pressure effected movements thereof.

10. In an electric current timing apparatus, a switch comprising a movable switch element and having a normal restored position and an operated position and biased to restored position, a reciprocable mechanism element, a cam supported by one element and a cam follower supported by the other element, the reciprocable element arranged to effect engagement of the cam and cam follower to effect operation of the switch during reciprocatory movement of the reciprocable element in one direction and to hold the switch operated during a continuation of said movement and at the end of a predetermined time interval to cause the cam to disengage the follower to effect restoring of the switch to restored position, the reciprocable element being ineffective to operate the switch in the other direction of reciprocation, the cam having a plurality of camming portions at different inclinations to cause the cam follower to move in the switch operating direction at different velocities in different parts of the said reciprocatory movement of the said element.

11. The apparatus described in claim 8 and in which means is provided to effect rapid initial movement of the reciprocable element to effect quick closing of the switch and to cause slower movement of the reciprocable element subsequently to closing of the switch contact.

12. In an electric timing apparatus, a switch comprising a movable element and having normal restored and operated positions and biased to one position, a movable apparatus element, a cam and a cam follower one supported by one element and the other by the other element, the apparatus element arranged to first move the switch movable element to move the switch from its restored position to operate it and hold it in its operated position and then after a predetermined interval to release it to effect return to its restored position all during movement of the apparatus element, the cam having a plurality of surfaces at different inclinations whereby the switch movable element will be moved at different velocities for a given velocity of movement of the apparatus element.

13. In an electric timing apparatus, a switch, an apparatus element movable to operate the the switch and to maintain it operated during subsequent continued movement and at a point in its movement to restore the switch, means to cause substantially unretarded initial movement of the apparatus element to effect quick operation of the switch and means to cause retarded subsequent movement of the apparatus element to effect timing of the duration of the operated condition of the switch.

14. In an electric timing apparatus, a switch, means for effecting a quick operation of the switch, a movable apparatus element for maintaining the switch operated during movement thereof and effecting restoring of the switch at a point in its movement and means for retarding movement of the movable element.

CHARLES H. RIPPL.